United States Patent [19]

Bryan

[11] Patent Number: 4,686,625

[45] Date of Patent: Aug. 11, 1987

[54] METHOD AND APPARATUS FOR GENERATING A DISPLAY OF WELL LOGGING MEASUREMENTS

[75] Inventor: John N. Bryan, Houston, Tex.

[73] Assignee: Dresser Industries, Inc., Dallas, Tex.

[21] Appl. No.: 648,863

[22] Filed: Sep. 7, 1984

[51] Int. Cl.$^4$ .............................................. G01V 1/00
[52] U.S. Cl. ................................ 364/422; 367/69; 367/71; 340/853
[58] Field of Search ... 364/422, 421, 804, 200 MS File, 364/900 MS File; 367/25, 34, 69, 71; 340/860, 861, 856, 853; 346/33 WL; 73/152

[56] References Cited

U.S. PATENT DOCUMENTS

| | | | |
|---|---|---|---|
| 3,388,375 | 1/1968 | Sloughter | 340/18 |
| 3,599,156 | 8/1971 | Miller et al. | 340/172.5 |
| 3,787,666 | 1/1974 | Schumann et al. | 364/521 |
| 3,986,163 | 10/1976 | Elliott | 364/521 |
| 4,010,476 | 3/1977 | Elliott | 346/1 |
| 4,297,879 | 11/1981 | Howells et al. | 364/422 X |
| 4,352,166 | 9/1982 | Schoonover | 364/422 X |
| 4,355,310 | 10/1982 | Belaigues et al. | 364/422 X |
| 4,509,150 | 4/1985 | Davis | 364/422 X |

OTHER PUBLICATIONS

"Data Communications A Users Guide", Sherman, K., Reston Publishing Co., 1981, pp. 175-181.

*Primary Examiner*—Jerry Smith
*Assistant Examiner*—Charles B. Meyer

[57] ABSTRACT

Initialization data independent of logging curve data values (such as grid definitions and starting depths) are transmitted to a remote terminal where well log curve displays are desired. Data corresponding to magnitudes of successive adjacent points on the curves are then sequentially transmitted as delta values. Each delta value is the difference in magnitude between two adjacent sample points on a given curve. Transmission of redundant and unnecessary information such as integer values of curve samples is thereby eliminated. Large amounts of well log data may then be transferred quickly to remote locations at low data transmission rates associated with conventional telephonic communication links. Cumulative error resulting from reconstructing curve sample magnitudes from delta values is eliminated by a bi-directional transmission error checking scheme.

18 Claims, 11 Drawing Figures

METHOD AND APPARATUS FOR GENERATING A DISPLAY OF WELL LOGGING MEASUREMENTS

FIELD OF THE INVENTION

This invention relates to methods and apparatus for processing data signals, particularly those of well logging measurements, and more particularly to methods and apparatus for processing such measurements and transmitting them to a remote location for reproduction of a visual display thereof.

BACKGROUND OF THE INVENTION

In the course of modern well logging operations it is conventional to generate digital measurements of preselected logging parameters at a remote well site which are stored on magnetic tape. This information is then transferred to a central data processing location wherein the data may then be more conveniently transformed into a form suited to the particular needs of the end user. Such transfer is typically made by means of a physical transporting of the digital data tapes. Alternatively, however, with the advent of readily available telemetry links, the data may be transferred for further processing at another location by such a link from the remote situs of the well to the processing center.

A serious problem with such a procedure is the significant time delays frequently encountered before the data in final format reaches the end user, such delays in many cases being on the order of days. Often this is because the resulting processed log must then be hand delivered or mailed to the location of the end user from the processing center, such as in a customer's well-log analysis offices across the country.

Delay can further be caused by the fact that the wellsite may be far distant from the data processing center as, for example, in the case of offshore operations. These delays can be extremely expensive inasmuch as equipment and personnel are idled at the wellsite and logging or drilling operations suspended until decisions based upon the processed well logging data can be made.

With the advent of modern computerized digital well logging trucks, wellsite data processing capability is now a reality. However, the problem of getting the visual representation of the log to the end user quickly is still a problem.

Yet another problem has been that even when the user is provided with data in a relatively timely fashion at a remote location, it is frequently desirable to request additional data or other processed versions of the data based upon initial review thereof. This, in turn, necessitates yet additional travel time of the new data from the location where the data processing occurs to the end user, adding additional delay and expense.

Accordingly, techniques have long been sought for providing more immediate access to processed well logging data by the end user as well as a means for providing a real-time link between the end user and the originating source of the data.

In an effort to solve the aforementioned problems, attempts have been made to provide portable data terminals such as the familiar facsimile machines at the remote location where the processed logging data is required, thus obviating the need for physical delivery thereof. In this manner, the processed data may be transferred electrically to the user over available data links such as telephones, telemetry, or the like. Several additional serious problems have been associated with these attempts however.

First, such facsimile machines typically produce pages at a time rather than a continual production of a visible indication of a well log, and thus the operator must periodically tape together segments of a log end-on-end.

Second, the amount of data associated with typical well logging information which must be thus transmitted can be extremely dense. For example, oftentimes fifteen or more curves of logging parameters constitute a well log. Associated with these curves will be numerous graphics, such as alpha-numeric depth or parameter indications, or graphics such as depth lines and the like. Moreover, logs may typically be generated over 5000 foot depth increments of borehole or more, with such parameters being measured as frequently as every 64th of a foot.

In many remote locations of the end user, the only practical link between the source of the digital logging tape (whether it be a digital well logging truck or a data processing center) and the end user is a conventional switched telephone line which is notorious for problems associated with attempting to transmit high data rates thereon. However, conventional facsimile machines must operate at relatively high data transmission or baud rates such as 9600 or the like in order to attempt to accommodate the high information density. Moreover, such machines typically have limited error detection schemes whereby when the telephone line quality deteriorates, significant error is introduced into the end product of the transmitted well log.

In an attempt to alleviate this problem, time consuming error detection schemes conventionally known in the art might be incorporated whereby such machines might drop to a lower baud rate so as to avoid some of the error. However, due to the information formatting associated with such available machines, the time required to transmit a visible representation of a meaningful portion of a well log would be prohibitive.

Accordingly, a method and apparatus for transferring processed well logging data from one location to another was needed whereby the equipment to be positioned at the remote receiving end could be readily portable and easy to operate. Moreover, such methods and apparatus were desired wherein the time required to transmit such vast amounts of data could be significantly reduced without introducing substantial error into the end product, and wherein such data may be transmitted at lower baud rates of 1200 or the like over conventional and readily available telephonic links, thus avoiding the problems associated with higher baud rates.

These and other disadvantages of the prior art are overcome by the present invention wherein an improved method and apparatus is provided for handling digital well logging data.

SUMMARY OF THE INVENTION

According to the method of the present invention, in a preferred embodiment a preselected logging grid is defined. The grid is comprised of horizontal and vertical lines whereby the magnitude of a logging measurement and the depth at which it is derived may be determined from spatial positioning of a visual representation of the measurement on the grid.

A digital initialization data block containing information for defining the grid is generated and then transmitted from a second location to a first location where it is subsequently stored.

Also at the second location a block of digital representations are generated corresponding to a plurality of well logging measurements which comprise a well logging curve. Each measurement is generated sequentially at adjacent depths within a borehole.

A first of such representations corresponds to the magnitude of a respective first measurement of the logging curve. Each successive such representation in the block corresponds to the next respective magnitude of the logging curve and represents a delta value or difference between such next respective magnitude and that of the adjacent-most or preceeding measurement's magnitude.

The block of digital representations is transmitted from the second location to a remote first location (wherein a visual display of the logging curve is desired) and then stored. A visual representation corresponding to the grid is generated at the second location from the digital initialization data block stored therein.

The stored first representation corresponding to the magnitude of the first measurement is retrieved and a visual representation thereof spatially positioned on the visual representation corresponding to the grid. The stored next successive representation is then retrieved, summed with the first representation, stored, and a visual representation thereof also spatially positioned on the grid representation.

The process continues whereby each successive delta value is retrieved, summed with the preceeding sum, and displayed until a visible segment of the logging curve is thereby formed. Successive additional blocks of digital representations of delta values corresponding to further pluralities of well logging measurements from the curve are thus generated at the second location and transmitted to the first location. They are then processed in a similar manner at the first location to generate visual representations at the first location of successive portions of the logging curve.

In a preferred embodiment of the present invention, it will be appreciated that because of the recurrent nature of the information contained in the visual representation of the grid, the initialization data block need only be transmitted once from the second to the first location, thus saving data transmission time during the ongoing transmission of log data. Also, once the initial value of the first sample is transmitted, additional such time is saved by transmitting only delta values of logging measurements (e.g., the difference between successive or adjacent logging curve measurement sample values). This obviates the need to transmit the entire integer value of each measurement of the logging curve.

Because successive visual representations of logging curve data points are derived by adding delta values to prior sums (as opposed to sending integer values for each measurement as aforementioned) errors occuring in transmission of blocks of digital representations are cumulative, and thus an error correction scheme is provided. According to one embodiment, a first error code is derived at first locations for each block of digital representations which is unique thereto and is transmitted with its respective block to the second location.

At the second location, a second error code is also derived for each block. For each corresponding pair of first and second error codes, a comparison is made and if a match is detected, a next block of digital representations is transmitted. However, if a mismatch is detected, a re-transmission of the block for which the error was detected is made.

DETAILED DESCRIPTION OF THE PREFERRED EMBODIMENT

Figure 1:
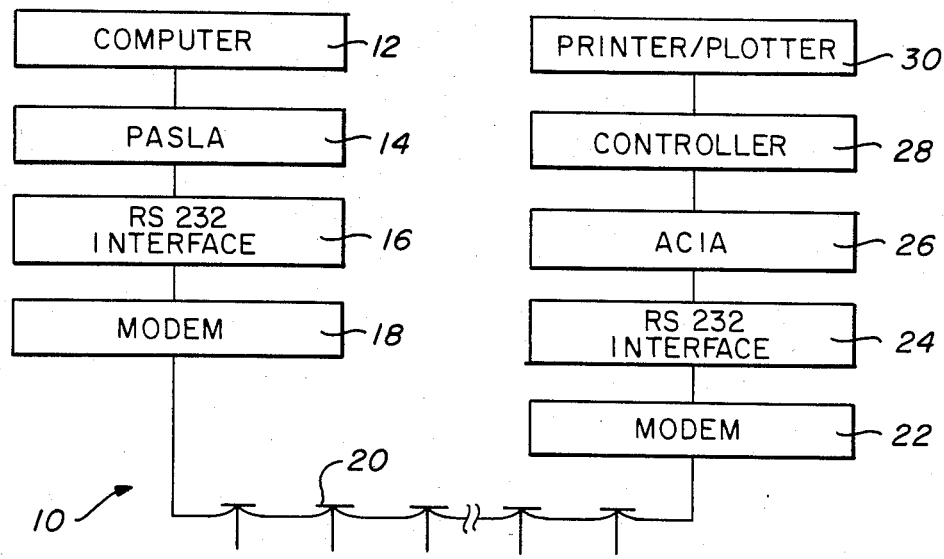
FIG. 1 is a schematic illustration in functional block diagram form of an embodiment of the present invention.

Referring first to FIG. 1, there will be seen depicted therein a general functional block diagram of the system 10 of the present invention for transmitting logging data from a first location to a second location wherein a visual display of this data may be generated. A general purpose computer 12 is provided having as one of its primary functions the formatting of logging data to be transmitted to the remote location. The precise formatting of this data will be hereinafter discussed in more detail, but for the moment we will assume that the computer 12 has a block of properly formatted data to be transmitted.

A pasla 14, an acronym for a programmable asynchronous single line adapter, provides for interfacing between the computer 12 and a modem 18 through a standard interface such as the RS232 interface 16 shown in FIG. 1. A function of the pasla 14 is basically to drive the modem 18 so as to ensure proper timing of data transmissions to and from the computer 12 through the modem 18. The pasla 14 will also convert parallel data from the computer 12 into serial form for serial transmission. Once a block of the digital data from the computer has passed through the pasla 14, wherein appropriate start and stop bits may be added along with other functions well known in the art, the block of data will thence be transferred to the modem.

The purpose of the modem 18 is to modulate this digital data, typically by means of a series of marks and spaces at 1200 Hz and 2400 Hz corresponding to digital zeros and ones, and to place these modulated signals corresponding to the digital words to be transmitted on an appropriate telephone link 20.

Referring now to the right hand side of FIG. 1, the digital data will travel over the telephone link 20 and be received at a desired location by a modem 22 which will demodulate the digital data on the telephone line 20 converting the mark and space frequencies to a standard logic level such as the familiar TTL 0-5 volt levels corresponding to digital zeros and ones. This demodulated data will travel from the modem 22 through a conventional interface such as an RS232 interface 24 well known in the art, and thus re-digitized information will be delivered in serial form to an ACIA 26.

The purpose of the ACIA 26 is similar to that of the pasla 14 inasmuch as it provides for an interface between the controller 28 and the modem 22. When the digital information thus transferred from the computer 12 is received by the ACIA 26, the controller 28 will detect this condition in a manner to be described later in greater detail and will thus retrieve the information from the ACIA. A controller 28 will thereafter process the received data which will then be output to a printer/plotter 30 for visual display. The apparatus just described on the left portion of FIG. 1 will for convenience hereinafter be referred to as a field system at one location, and the apparatus depicted in the right portion of FIG. 1 will be referred to collectively as the remote terminal at a second remote location. It will be recalled that the field system could be in the alternative either a central data processing lab or a computerized well logging truck or the like having access to the telephone link 20. On the other hand, the terminal system wherein a visual display of logging data transmitted from the field system is desired may be located virtually anywhere where a telephone link 20 is provided inasmuch as, in accordance with the present invention, the terminal system has been designed to be extremely portable.

It will be helpful at this point to discuss in more detail the types of data and their formatting which might be expected to be transmitted from the field system. It will be appreciated that at times it may be desirable to send commands to the terminal system from the field system or vice-versa without data. Thus, a control block may be formulated by either system comprised of six bytes which are, in order, conveying the following information: start of message; count of total bytes in block; block number and command; end of block; calculated CRC; and end of message.

The first and last bytes are simply start and stop indicators of the beginning and the end of a block of data. The data count byte is for error detection purposes in ensuring that all bytes in the block have been received. In like manner, the byte which provides for a block number is also for error purposes. This number will be retained until verification of a valid data transmission is made from error detection schemes to be hereinafter discussed. If, for example, either system is powered down, this retained last-transmitted block number may be utilized to secure a re-transmission of the last block.

With respect to a command byte in a block of data, it will be appreciated that several commands might be desired which may be encoded by four bits of the block numbers/command byte of a control block. Such commands might be a command indicating that logging curve data is being transmitted, that initialization data is being transmitted, that a repeat of a last response is requested, or the like.

Control blocks containing data in addition to commands may also be transmitted between the systems and will take the following form:

| BYTE | DEFINITION |
| --- | --- |
| 0 | Message Start |
| 1 | Number of Bytes in Block, N |
| 2 | Block Number (Four Bits) and Command (Four Bits) |
| 3 to N | Bytes of Data |
| N + 1 | End of Block |
| N + 2 | Calculated CRC Error Code |
| N + 3 | End of Message |

The distinction of this control block over the previouly described one is that it may include 3 to N bytes of data, such data which may be data corresponding to logging curves, or data for initialization of a log, or even a series of commands.

In accordance with a feature of the present invention, it is convenient to discuss at present how data values are transmitted from the field system to the terminal system. It will be recalled that a serious problem with remote well logging display apparatus is related to the tremendous data densities which must be transmitted. One solution to this problem with respect to curve values employed in the present invention is to transmit not simply the integer value of each logging measurement for display at a remote location, but rather merely a change in the logging measurement's value over that of a previously transmitted logging measurement.

Figure 6:
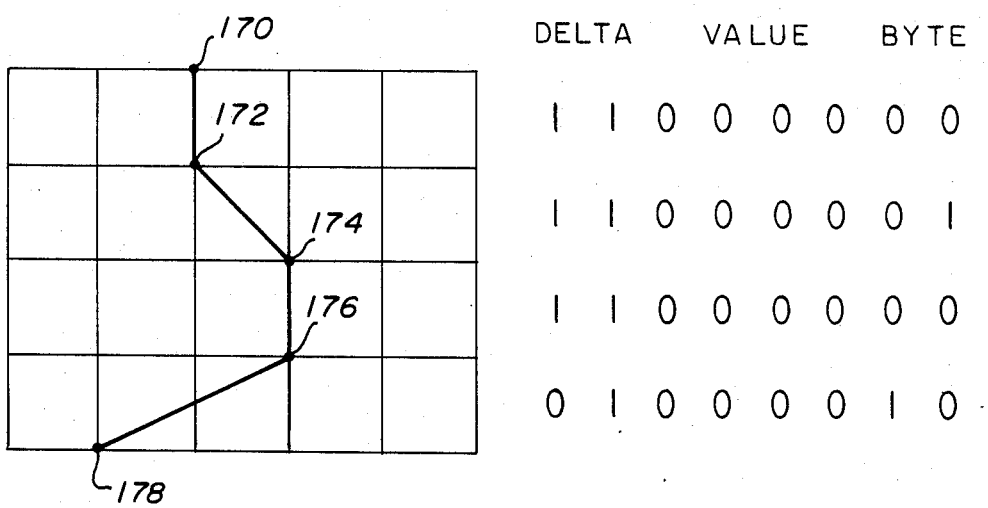
FIG. 6 illustrates a feature of the present invention wherein delta values associated with adjacent logging measurements are derived and transmitted.

Thus referring to FIG. 6, there will be seen depicted therein a highly simplified example of a portion of a logging curve for which a visual display is desired including a schematic illustration of grid lines which conventionally are associated with such logging displays. To the right of each section of the displayed logging curve, there will be seen an eight bit byte uniquely associated with each segment of the curve and captioned a "delta value byte". Assuming for the moment that if a visual logging display could be initially positioned correctly, such as at location 170, it might be possible to transmit information from which the curve shape could be determined wherein the information only relates the aforementioned change in the curve rather than its absolute value. Specifically with respect to FIG. 6, note that as we progress on the logging curve from location 170 through 172 and on to 178, the logging curve initially has no change and steps once to the right, then does not change again, and finally decrements two units to the left. Observing the last two bits of each byte depicted in FIG. 6 on the rightmost side, it will be noted that as we go from location 172 to 174 a one bit appears in the byte associated with that segment. However, as we traverse from location 174 to 176, the bit changes back to a zero, and as we move on the curve from location 176 to 178, the second bit from the right becomes a 1 (or a 2 in Arabic) indicating two units of transition.

Moreover, observing the left-most bits of each byte, it will be noted that the bits remain as ones until the transition from location 176 to 178. This may be seen to correspond to the fact that from transition along the curve from 170 to 176, displacement has either been zero or to the right which, by convention, is positive. However, on a negative transition from location 176 to 178 it will be noted that this has been signified by the left-most bit in the byte adjacent line segment 176-178 becoming a zero.

From the foregoing, it can thus be appreciated that data describing the shape of a given logging curve can be described by transmitting only information regarding changes in magnitude of the curve from a previous value of the curve, i.e., only the amount of the change and whether it is positive or negative. In accordance with the present invention, by employing this method, particularly when a great number of logging curves are to be transmitted, a significant savings can be made in the amount of information which needs to be transmitted over the telephone link.

It will also be recalled from the foregoing that one of the problems associated with the approach just described, wherein delta values or changes in magnitude of measurements are transmitted rather than the actual or integer value of the measurement, is that if an error is introduced into one of the delta values, the error will cumulate. Thus, it is desirable to provide for a method of detection of errors in transmission of logging data between the field and terminal systems.

Thus, in accordance with the present invention, the following method is employed to provide for a check of the integrity of transmitted data. It will be recalled that a portion of a block of data, commands, or the like, has reserved therein a byte referred to hereinbefore as "calculated CRC", the latter being known in the art as a cyclic redundancy check. This byte will perform the same function as the addition of a parity bit, for example, and other error correction schemes known in the art. In the method of the present invention, a first byte of data will be exclusive or'd with zero, resulting in a CRC term. This term will then be exclusive or'd with a next byte of data being transmitted in the block, resulting in a next CRC term. The process will be repeated for successive bytes of data (each of which may correspond to a logging curve data point for example), until a final CRC term is derived. This CRC, the "calculated" CRC will then be placed in the proper location reserved for it in the block of data to be transmitted.

When the block of data is received, either by the field of terminal system, the first byte of data in the block will be exclusive or'd with zero to obtain a first CRC term. The process previously described to arrive at a final CRC term will then be repeated, at which time the final CRC term arrived at will be compared to the final CRC term derived at the system originating the transmission of the data block. If the CRC final terms match, it can be assumed that a valid data transmission has occurred, and a request can be made for a next block of data. However, if a mismatch is detected between the transmitted CRC final term and the final CRC term calculated by the receiving system, this indicates an error in data transmission and a request for the re-transmission of the block of data will then be made by the receiving system.

The foregoing data error checking may be seen more clearly with reference to the following example:

| EXAMPLE | | |
|---|---|---|
| Exclusive or | 00000000 | Zero |
| | 10010010 | Data Byte 1 |
| | 10010010 | CRC (Intermediate) |
| Exclusive or | 10010010 | CRC (Intermediate) |
| | 10111100 | Data Byte 2 |
| | 00101110 | CRC (Intermediate) |
| Exclusive or | 10101000 | CRC (Intermediate) |
| | 00000100 | End of Block Byte |
| | 10101100 | CRC (Final) |

The foregoing has illustrated generally the apparatus and scheme for transmitting logging data from one location to another where it will be displayed, as well as the technique of the present invention for transmitting only delta values and checking for transmission error. However, it will be appreciated that much more detail is involved in initializing such communication, for example, but more detailed description of such initialization and the like will be deferred until a more detailed discussion of the flow diagrams of the programs operating the computer 12 and controller 28.

Figure 2:
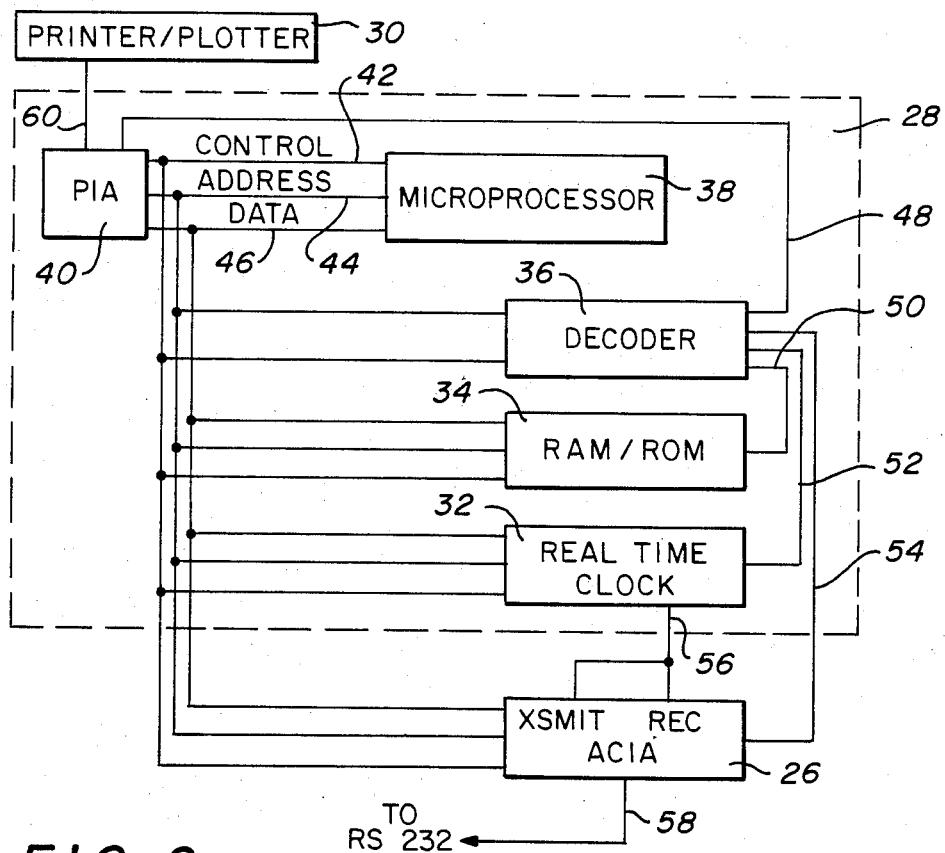
FIG. 2 is a more detailed block diagram of a portion of the invention depicted in FIG. 1.

Referring now to FIG. 2, there will be seen depicted therein a portion of the terminal system of FIG. 1, but more particularly, a more detailed diagram of the controller 28. The apparatus depicted in FIG. 2 may be recognized to be a generalized functional block diagram of a general purpose microprocessor system. Thus, the general features of such a system will be described with respect to FIG. 2 prior to a more detailed discussion of the operation of the system in the present application.

Accordingly, the controller 28 of the terminal system will include a conventional microprocessor 38 having the familiar control, address, and data buses 42, 44, and 46, respectively. The bus lines are each delivered to each conventional building block of such a system, namely random access memory and read only memory 34, real time clock 32, the previously described ACIA 26, and a peripheral interface adapter or PIA 40. Additionally, decoder circuitry 36 is provided to which the control and address lines 42 and 44 are delivered. Decoded control or command is delivered from decoder 36 on lines 48, 50, 52 and 54 to the respective PIA 40, ACIA 26, clock 32, and RAM/ROM 34. Finally, it will be noted from FIG. 2 that it is actually the PIA 40 of the controller 48 which interconnects directly from the visual display printer/plotter 30 on line 60. In like manner, as depicted in FIG. 1, the ACIA 26 interconnects through line 5B to the interface 24.

A more detailed discussion of the operation of the controller 2B of the present invention will now be given. First, it is important to realize that the system depicted in FIG. 2 is known as a memory mapped system, which means that when the microprocessor 38 puts out an address on address bus 44, the decoding circuit 36 decodes this address and selects a particular device for I/O with the microprocessor 38, whether it be the PIA 40, memory 34, real time clock 32 or ACIA 26. Thus, the microprocessor 38 can address any peripheral device during a valid E pulse (to be discussed hereinafter) and read or write to the data or control registers of the peripheral. In other words, to the microprocessor 38, these peripheral devices appear to be only as memory locations.

Referring to operation of the particular peripheral devices one at a time, first, with respect to the ACIA 26, its basic purpose is to convert serial data from modem 22 to data in a parallel form which may be handled on data bus 46 by the microprocessor 38. Recalling the early example of transmitting a block of data from the field to the terminal system, when data is received by the ACIA 26, it is stored in the received data register included therein, which sets an interrupt request or IRQ line (part of the control bus 42) low. The microprocessor 38 detects when an IRQ is present. When the microprocessor reads the status registers of all peripheral devices, it will determine that a bit has been set in the status register of the ACIA 26 indicating an IRQ was from the ACIA, and thus the microprocessor will read the data register of the ACIA containing the transmitted digital information corresponding to the logging data. When the data register of the ACIA has thus been read, the IRQ to the microprocessor 38 is thus cleared. The microprocessor will then operate upon the information just received from the ACIA, begin preparing the information for output to the PIA 40 under program control, and ultimately output the information to the visual display on the plotter 30.

Referring to the PIA 40 in more detail now, it may be thought of as a latch. When data is present on the data bus 46 and a control word has been placed in the control register (not shown) in the PIA by register select lines running to the PIA 40 (also not shown), then this data will appear on the output of the PIA and may then be delivered to the printer 30 on line 60. In like manner to the ACIA 26, it will be recalled that the PIA 40 (as well as the clock 32, etc.) may generate an IRQ or interrupt request to the microprocessor 38. In fact, when the PIA has delivered processed data ready for storage to the printer on line 60, and when the printer 30 and PIA 40 are thus no longer busy, an IRQ from the PIA 40 will be transmitted to the microprocessor 38 signifying that the PIA 40 is awaiting additional data. Due to the multitasking and interrupt features of the system, it will be appreciated that the microprocessor 38 can be performing several tasks at different times such as acquiring data from the ACIA, outputting data to the PIA, and performing calculations on data.

With respect to commercially available embodiments of the functional block diagrams depicted in FIG. 2, it has been found that an MC6802 type microprocessor available from Motorola Semiconductor Products, Inc. has been found to function successfully in the present invention. With respect to the clock 32, a Motorola 6840 has performed satisfactorily. RAM/ROM 34 may be of any conventional type. With respect to the ACIA and the PIA, an MC6850 ACIA and an MC6820 PIA also from Motorola will perform the hereindescribed functions quite well. It will be noted that with respect to the particular characteristics of such functional building blocks as the microprocessor, PIA, ACIA, and the like, their characteristics are well known in the art and accordingly will not be herein elaborated upon. However, for further information, reference is made to the M6800 Microprocessor Applications Manual by Motoroyla Semiconductor Products, Inc., 1975, and information contained therein is herein incorporated by reference. Particular detailed information regarding the construction and operation of the PIA and ACIA may be found in Chapters 3-8, and Chapters 3-21, respectively.

Figure 2A:
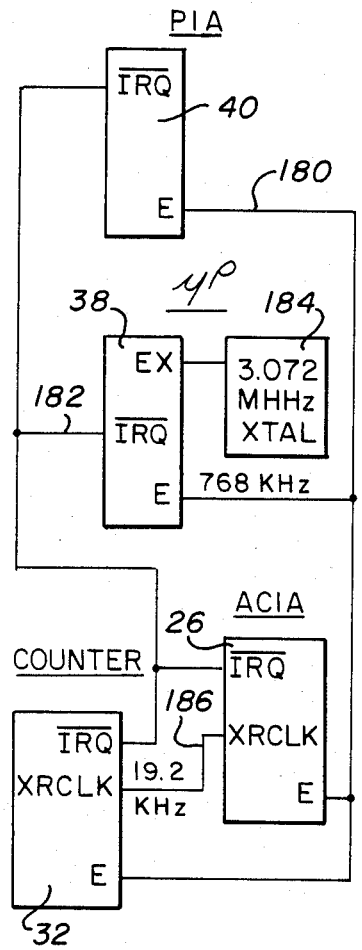
FIG. 2A is a more detailed diagram of a portion of the invention depicted in FIG. 2.

Referring now to FIG. 2A in more detail, a few particular features of the apparatus depicted in FIG. 2 will now be discussed. First, with respect to FIG. 2A, although not shown in FIG. 2, the microprocessor 38 will be provided with a stable frequency source such as a crystal oscillator 184 which is oscillating at 3.072 MHz. Microprocessor 38 operates upon this clock and generates an E pulse 180 at a lower frequency of 768 KHz. This pulse train will be delivered to PIA 40, ACIA 26, and counter 32. The previously mentioned interrupt request generated by a peripheral and transmitted to the microprocessor to indicate that the peripheral is in need of servicing may be seen in FIG. 2A as IRQ 182. Finally, with respect to FIG. 2A, the counter 32 will operate upon the E pulse train 180 so as to divide it down to 19.2 KHz. This transmit-receive clock or XRCLK 186 is delivered to a similar port on ACIA 26.

Figure 2B:
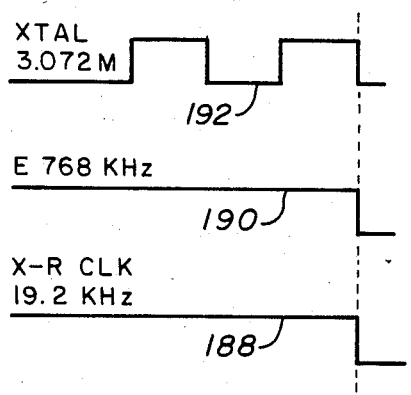
FIG. 2B is a timing diagram illustrating operation of a portion of the apparatus depicted in FIG. 2.

Referring now to FIG. 2B, a timing diagram of the previously described signals may be seen depicted therein. More particularly, it will be noted that the trailing edge of the three hereinbefore noted signals, i.e., the crystal frequency 192, the E or enable pulse 190, and the XR clock 188, will all be in phase preferably in the sense that their trailing edges of the pulses occur substantially simultaneously.

The E pulse, also known as the enable pulse, may be recognized as one phase or $\phi$ 2 of a typical system clock, i.e., it is the half portion of the machine cycle wherein all I/O such as data transfers take place, and it is transmitted via the control bus 42 shown in FIG. 2. The microprocessor provides timing signals to the ACIA and PIA via the E or enable pulse. If the microprocessor detects an interrupt request or IRQ, after its polling routine, the microprocessor 38 will go read the information of the particular peripheral. Because all of the peripherals are operating on the same synchronous clock, and because all data transfers and I/O must take place during this E or $\phi$ 2 portion of the clock cycle, the microprocessor 38 is guaranteed of getting the data it is fetching immediately. In other words, there is no wait for the leading edge of some other peripheral's asynchronous clock in order to effect data transfer. Moreover, because the transmit receive clock 186 is at a rate 16 times faster than the BPS data transfer or transmit-receive rate of 1200 BPS, the microprocessor 38 is never reading an edge of data or waiting to get data in and out of the ACIA 26. In this manner, it has thus been found that throughput of logging data for display on the printer 30 is substantially increased.

Figure 3:
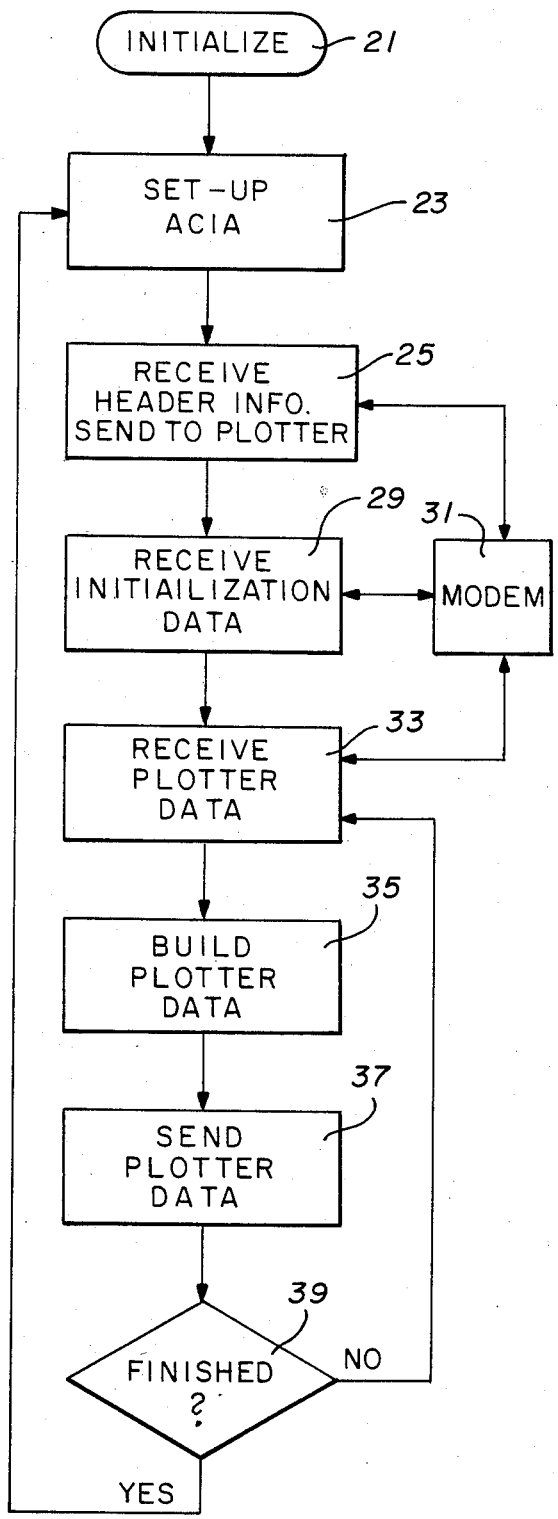
FIG. 3 is a flow diagram of a portion of a computer program employed with the apparatus of FIG. 1.

Microprocessor 38 will be operating under program control stored in memory 34. With reference to FIG. 3, a general flow of the signal processing of the terminal system will now be described. First, it will be appreciated that the terminal system must first be provided with some initialization data from the field system as indicated in block 21. It will be recalled from previous discussion that it is a feature of the present invention to provide from the field system a great deal of reoccuring information in a well logging plot as initialization data to the terminal system whereby during an ongoing transmission of a logging curve data set, the terminal system will be operating upon this initialization data. This is to be contrasted with such data having to be sent during transmission of log data values which would seriously slow down the available transmission rate of logging data itself.

An example at this point may be helpful. It can be appreciated that, for example, if it has been decided to display a logging grid wherein horizontal depth lines are separated by a preselected increment of borehole depth such as 20 feet, it is pointless to continue to send information for generating such lines continuously along with the logging curve data itself. In other words, such graphics data is independent of actual value of parameters on logging curves. Consequently, it should be possible to send initialization data regarding such information to the terminal system prior to transmission of logging data values. Accordingly, the terminal system may itself then generate appropriate buffers for drawing grid lines, curve labels, and the like, without cluttering up the data transmission telephonic link 20. Representative examples of such initialization data which may be sent would include such things as data fields indicating information required to generate grid and depth lines, depth label positions, starting depth, number of curves to be transmitted, and the like. Upon such initialization as indicated by block 21 of FIG. 3, the microprocessor 38, in response to program control, will then proceed to set up the ACIA for communication with the field system as shown by block 23. Next, as shown by block 25, the terminal system will receive, from the field computer system, header information which may appear at the top of a well logging display to be generated by the printer 30. With respect to block 29 of FIG. 3, in the general flow diagram of the software, it will be appreciated that this is the point at which the aforementioned initialization data is received, whereas block 21 merely indicates the entry into this initialization loop which is called up at the beginning of the logging transmission run. Still referring to FIG. 3, a modem block 31 is indicated therein connected to blocks 25, 29, and 33 for purposes of schematically illustrating that such data called for by the blocks 25, 29, and 33 is actually received over the telephonic link 20 through the modem 22.

Still referring to FIG. 3, once the initialization data has been received and processed in accordance with block 29, the terminal system is thereafter conditioned to begin receiving actual plotter data in block 33 from the field system. It will be recalled that such plotter data may include the previously described blocks of data which include delta values corresponding to magnitude differences on each of the logging curves to be transmitted and displayed. Inasmuch as only delta values are transmitted, it will be appreciated that in the terminal system the actual value of the magnitude of the logging curves must be calculated or "built" by incrementing by the delta values the preceeding magnitudes of logging curves. In like manner, it will be appreciated that the information to be displayed from the initialization, data such as logging curve grid lines, will also have to be "built" by generating buffers, including data points for drawings these lines, for example, from the initialization data. This process is conceptually represented by block 35, wherein buffers are constructed of plotter data for the plotter. In other words, buffers will be created containing locations on a visual display of the printer 30 for displaying depth lines, labels, grids, curve data, or even ASCI II. These separate buffers containing actual values of the magnitude of the logging curves and the aforementioned display points for depth lines and the like will be or'd together, and then such plotter data will be sent to the plotter through the PIA 40 as illustrated by block 37.

Finally with respect to the general flow of the terminal signals, the routine of FIG. 3 will query whether in accordance with the commands received from the field system all plotter data has thus been received, processed, and sent to the plotter. If not, the routine loops back to block 33 to receive yet additional plotter data. On the other hand, if all such data has been received and sent to the plotter, the routine loops back to block 23 to set up the ACIA 26 for continued communication with the field system.

Figures 4, 4A:
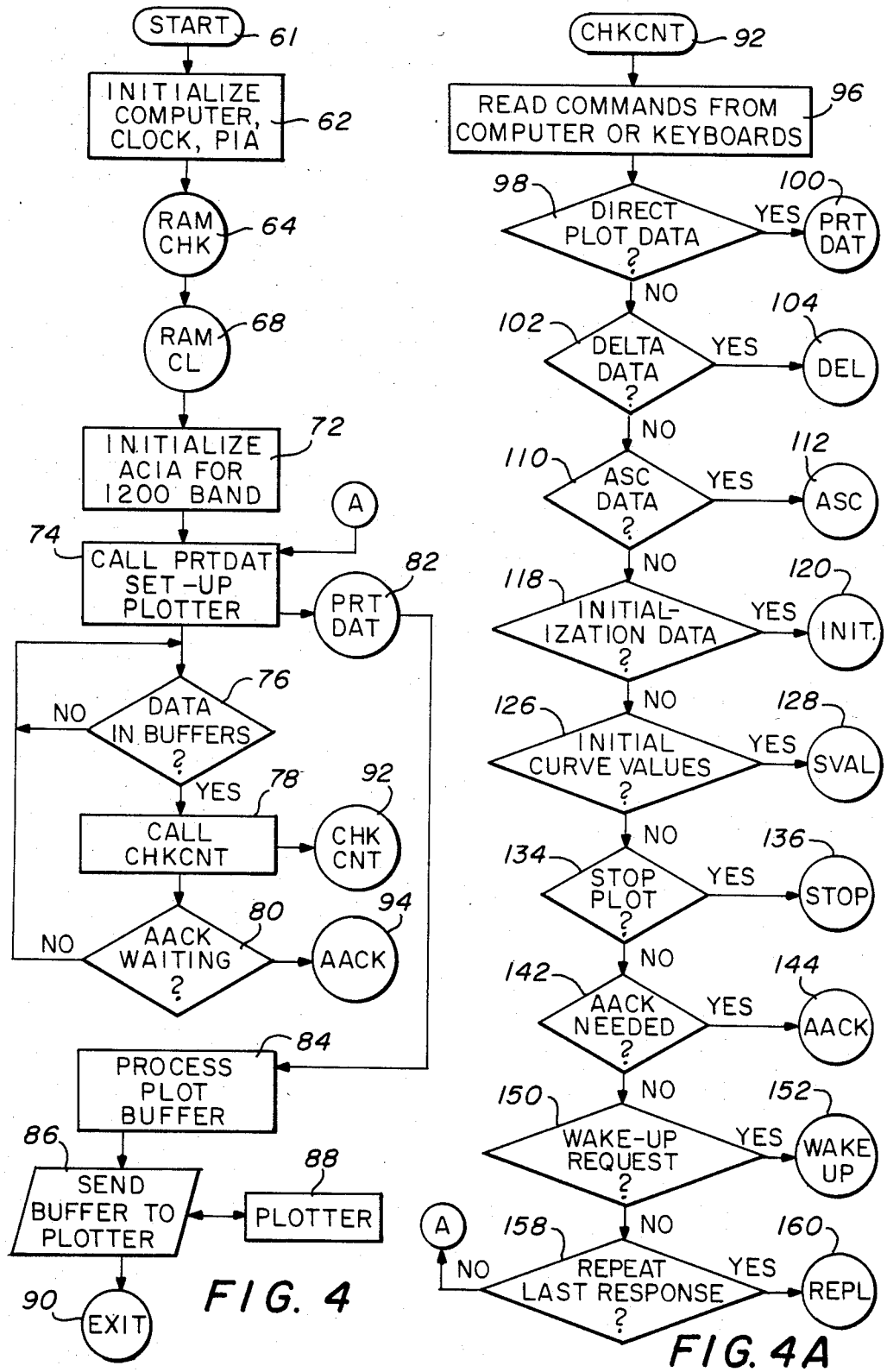
FIG. 4 is a flow diagram of another portion of a computer program employed with the apparatus of FIG. 1.
FIG. 4A is a flow diagram of still another portion of a computer program employed with the apparatus of FIG. 1.

Referring now to FIG. 4, a flow diagram is depicted therein for initializing the terminal system upon either a reset command from the field system or a power up, the start of such routine being indicated by block 61. First the plot computer or microprocessor 38 is initialized, and the real time clock in the ACIA 26 and the PIA 40 between the microprocessor 38 and the printer 30 are set, as shown by block 62. Next, in this reset or power up routine of the terminal system, a RAM memory 34 diagnostic routine is run to ensure that RAM memory 34 is operating correctly, as shown by subroutine 64, and next a subroutine 68 is run to clear the RAM memory 34. The ACIA 26 is then provided with initialization data wherein it is set to run at 1200 baud. It will be noted that although a commercially common baud rate of 1200 has been selected, the invention contemplates operation at other baud rates and is not intended to be limited to the rate herein discussed.

Upon initializing the ACIA in accordance with block 72, a subroutine is called in block 74 to set up the plotter for receiving input from the PIA 40 of FIG. 4. In effect, this subroutine processes the aforementioned print buffers which have been formed as shown in block 84 and sends them to the plotter as shown by blocks 86 and 88, after which the routine exits in accordance with block 90.

Still referring to FIG. 4, in response to program control, the microprocessor 38 thereafter queries whether any data remains in the aforesaid buffers, as shown by decisional block 76. If no such data exists, the terminal system will sit in an idle condition as indicated by the "No" until data is found in the buffers. When such data is found, first a subroutine is called to process commands to determine what action the terminal system should take, as indicated by block 78 and 92. This routine will basically isolate the command to determine whether it originated from the computer 12 or a keyboard associated with the field system for providing ASCI data or the like.

Referring now to FIG. 4A, a more detailed flow diagram of this subroutine for processing commands to determine which action the terminal system must take is therein depicted. Thus, upon entry of this subroutine as indicated by block 92, the command is isolated in block 96 to determine whether it is from the field system, the keyboard, or a download to RAM 34. If from the keyboard (not shown), the subroutine 82 will be called to print data as it is received from the keyboard on the printer 30. If the command comes from a download (again not shown), then a command is sent back to the field system so as to start the download process.

If, however, the command is from the field system, then one of the routines shown in FIG. 4A will be called, depending upon the command. It will be recalled that in the previous discussion regarding details of the data and command blocks transmitted from the field system to the terminal, some of these possible commands from the field system are discussed. However, referring more particularly to FIG. 4A, first if the command received from the field system is a direct plot command, this will allow users of the field system to plot directly from the computer 12 to the plotter 30 without format changes introduced by the microprocessor 38. Accordingly, with respect to block 98, a subroutine 100 is called to cause such direct plotting of points, characters, or a combination of both. A next possible command from the field system is a delta data command as shown by decisional block 102. If it is a delta data command, the subroutine 104 is called to take this delta data and formulate it for the plotter 30 in a manner previously described wherein delta values are summed with prior logging curve magnitudes to arrive at next actual curve magnitudes. Still referring to FIG. 4, it is also possible for the field system to originate a command wherein ASCI data such as alpha-numeric messages or the like are sent from the field system to the terminal system, as shown by block 110. If so, the subroutine 112 is called whereby the terminal system receives this ASCI data and converts it for display on the plotter 30. It is also possible that the command received from the field system is an indication that initialization data is being delivered as shown by block 118, in which case subroutine 120 enables the terminal to accept such initialization data from the field system.

Continuing with the possible commands from the field system, as shown by block 126 such command might be the starting values for logging curves, in which case subroutine 128 is called. It is important to note here that at the beginning of transfer of logging data for display by the terminal system, initial values for the logging curves must be transmitted in order to give a starting point for the curves. This is because thereafter the only logging curve data typically transmitted, in order to save transmission time, are delta values or changes in logging curve values. This explains the need for the blocks 126 and 128 wherein these initial curve values may be transmitted to the terminal. Yet another command which may be transmitted from the field system is a stop command wherein the terminal system is commanded to stop plotting as shown by blocks 134 and 136. Another such command might be a command that the terminal system respond back to the field system in response to a query from the field system as to whether the command was received. As illustrated by blocks 142 and 144, if the field system requests an acknowledge message from the terminal system by means of the command, the terminal system will respond accordingly. Another command which may be sent from the field system is a wake up request as shown by blocks 150 and 152. Such a command is sent when the terminal system has been idle and the routine indicated by blocks 150 and 152 restores memory and resets the peripheral controllers previously described. The subroutine then exits to the aforementioned start routine to begin the next log. The last command which may be transmitted from the field system is a command for the terminal system to repeat the last response which it previously gave as indicated by blocks 158 and 160. If in response to this subroutine the terminal system requires a repeat of a previous command, as indicated by subroutine 160, the field system is requested to repeat the last command. As indicated by a comparison between FIGS. 4 and 4A, upon processing commands from the field system, the routine of FIG. 4A will exit back to block 74 to set up the plotter again.

Figures 5, 5A:
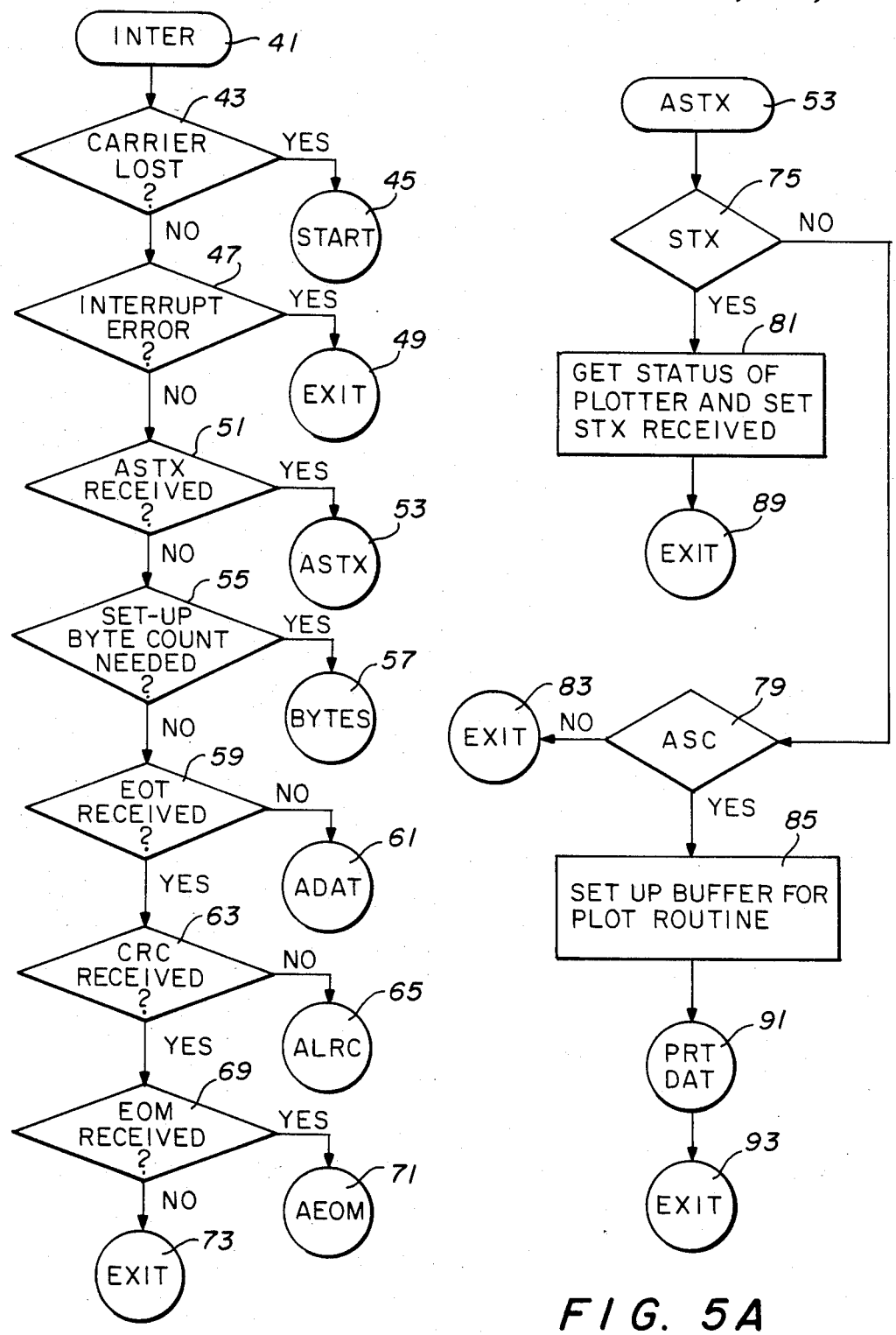
FIG. 5 is a flow diagram of yet another portion of a computer program employed with the apparatus of FIG. 1.
FIGS. 5A and 5B are flow diagrams of portions of subroutines depicted in FIG. 5.

From the foregoing it will be apparent that the plot computer or microprocessor 38 basically has two separate interrupt entries within its program (disregarding a header interrupt), the first being the previously described start routine of block 61 depicted in FIG. 4, and the second being the interrupt routine, entry of which is depicted in block 41 of FIG. 5.

Figure 5B:
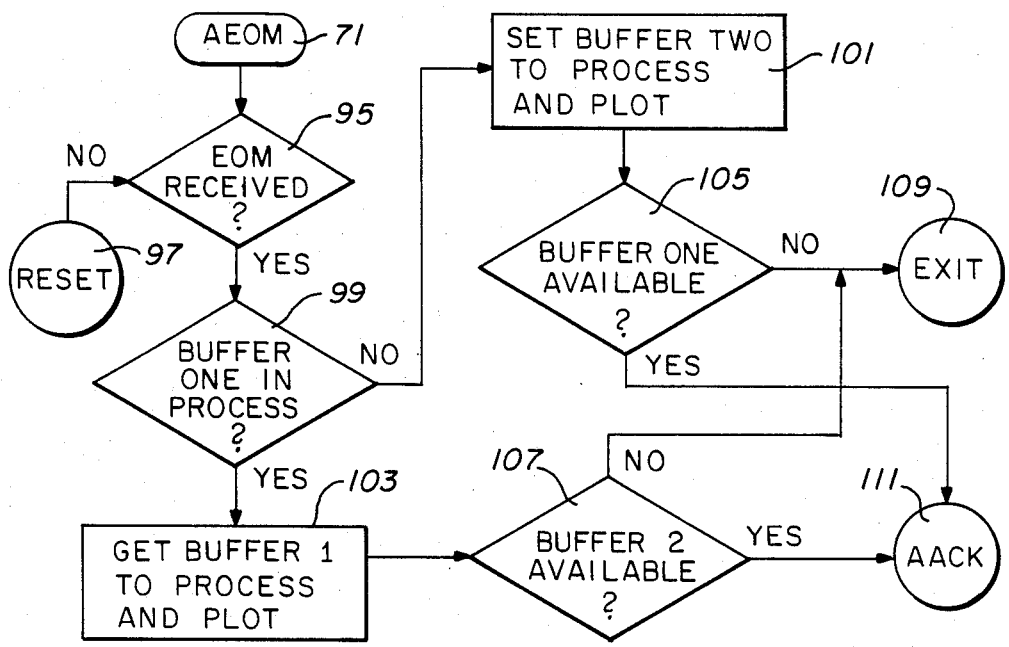

With reference to FIGS. 5, 5A, and 5B, an additional routine is provided of program control for the microprocessor 38 for purposes of miscellaneous functions previously mentioned, such as determining the final CRC word from transmitted data, and the like. Thus, referring to FIG. 5 and the routine 41 if the telephone carrier is lost, as indicated by block 43, this is one of the reset situations similar to a power up which will initiate the start up subroutine of FIG. 4. If there was an error in initiating the interrupt, the routine 41 simply exits as indicated by blocks 47 and 49. The decisional block 51 and correlative subroutine 53 establish, as shown in FIG. 5A, whether a message start has been received.

Still referring to FIG. 5A, if the answer is yes as indicated by block 75, the current status of the plotter 30 (i.e., whether it is idle and ready to receive additional data or not) will be ascertained by the microprocessor 38, and the fact that a message start has been received will be stored in memory 34 and the routine will exit per block 89. On the other hand, if a message start has not been received, the subroutine will then query whether ASCI data has been received from the field system. If so, as indicated by block 85, buffers will begin to be set up for the plot routine as indicated by subroutines 91 and 93 whereby this ASCI data will be plotted to the printer 30. However, if ASCI data has not been received, the routine exits as indicated by block 83.

Referring to FIG. 5, if an interrupt is generated indicating that the byte count of a data block is required, as indicated by decisional block 55, the subroutine 57 is entered wherein the byte count of the data block is received and stored. It will be recalled that for error checking purposes one of the bytes in a data block includes the total byte count in the block. It will also be recalled that at the end of a block prior to the CRC word an "end of block" byte is included to indicate that all of the commands or data preceed it. Accordingly, if this end of block indication has not been received as indicated by block 59, subroutine 61 is entered wherein data is received and the CRC is determined. If on the other hand the end of block byte has been received, the routine 41 of FIG. 5 will then query whether the CRC byte has been received. Again, it will be recalled that as in the example of the format of control blocks with data, following the "end of block" byte is the calculated CRC word. If however the CRC has not been received, the subroutine 65 is entered wherein the CRC byte is to be received. If the CRC byte has been received, as indicated by block 69, the control word will be set to indicate the CRC has been received and the routine will query whether the end of message byte has been received. Again, it will be recalled that the end of message byte is the last byte in the control block. If it has not been received, the routine exits through block 73. If the last byte has been received indicating the end of message, the subroutine 71 is entered as indicated in FIG. 5B.

With particluar references to FIG. 5B whenthe end of messsage byte has been received as indicated by block 95, the decisional block 99 of the subroutine will query whether a first buffer is in process and, is so, the buffer will be plotted as indicated in block 103. If this is not the case, a second buffer is set to process and plot as shown in block 101. If either buffer 1 or 2 is available as indicated by block 105 and 107, the subroutine 111 is thereafter entered which will send an acknowledge command back to the field system. If neither buffer is available, the routine exits as indicated by block 109.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed are defined as follows:

1. A method for generating at a first location a visual display corresponding to well logging data present at a second location, comprising:
   (a) generating a digital initialization data block at said second location;
   (b) transmitting said data block to said first location;
   (c) storing said data block at said first location;
   (d) generating at said second location a digital representation of a first value of said logging data derived at a first depth within a borehole;
   (e) transmitting said digital representation to said first location;
   (f) storing said digital representation at said first location;
   (g) deriving at said first location from said stored data block a first set of digital numbers corresponding to first positions on said display;
   (h) deriving at said first location from said stored digital representation of aid logging data second set of digital numbers corresponding to second positions on said display;
   (i) displaying at said first location visual representations of said first and second sets of digital numbers at respective said first and second positions on said display;
   (j) generating at said second location a digital representation of a delta data value corresponding to the difference between said first value of logging data derived at said first depth and a second value of said logging data derived at a second depth within said borehole;
   (k) transmitting said digital representation of said delta value to said first location;
   (l) storing said digital representation of said delta value at said first location;
   (m) deriving at said first location from said stored data block a third set of digital numbers corresponding to third positions on said display;
   (n) deriving at said first location from said stored first value of said logging data and said delta data value a fourth set of digital numbers corresponding to fourth positions on said display; and
   (o) displaying at said first location visual representation of said third and fourth sets of digital numbers at respective said third and fourth positions on said display.

2. The method of claim 1, wherein said first and second positions are co-linear and said third and fourth positions are co-linear.

3. The method of claim 2, wherein said co-linear first and second positions are substantially parallel to said co-linear third and fourth positions.

4. A method for generating a visual display of at least first and second data points on a well logging curve, comprising:
   displaying at a first location a visual indication of said first data point;
   storing a digital representation of said data point at said first location;
   transmitting via a telephone link a digital representation of a first function comprising the difference between the magnitudes of said first and second data points from a remote location to said first location;
   retrieving said digital representation of said first data point;
   generating a digital representation of a second function of said first function and said retrieved digital representation of said first data point; and
   displaying at said first location a visual indication of said digital representation of said second function with said visual indication of said first data point.

5. The method of claim 4, wherein said digital representation of said first data point is transmitted to said first location via said telephone link from said remote location prior to the step of displaying said visual indication of said first data point.

6. The method of claim 4, wherein said second function is the sum of said difference and said magnitude of said first data point.

7. The method of claim 6, further including:
   storing said digital representation of said second function at said first location;
   transmitting via said telephone link a digital representation of the difference between said second function and a third data point on said curve to said first location;
   retrieving said stored digital representation of said second function; and
   generating a digital representation corresponding to the sum comprised of said second function and said difference between said second function and said third data point.

8. The method of claim 4, further including:
   deriving a first error code corresponding to said first function at said remote location; and
   transmitting via said telephone link a digital representation of said first error code to said first location.

9. The method of claim 8, further including:
   deriving at said first location a second error code corresponding to said digital representation of said first function transmitted to said first location.

10. The method of claim 9, further including:
    comparing said first and second error codes at said first location;
    deriving a signal in response to said comparison; and
    transmitting via said telephone link a digital representation of said signal to said remote location.

11. The method of claim 10, further including:
    re-transmitting said digital representation of said first function to said first location when said signal is a first value; and
    wherein said digital representation of said difference between said second function and said third data point is transmitted to said first location when said signal is a second value.

12. The method of claim 11, wherein
    said first value of said signal corresponds to said first and second error codes mis-matching; and
    said second value of said signal corresponds to said first and second error codes matching.

13. A method for generating a visual display at a remote location of measurements of a well logging parameter derived at successively adjacent depths within a borehole, comprising:
    defining a grid for visually indicating the magnitude of each said measurement and the corresponding said depth at which it was derived within said borehole;

deriving a digital representation corresponding to said defined grid;

transmitting said digital representation via a telephone link to said remote location;

displaying said grid in response to said transmitted digital representation of said grid at said remote location;

deriving as digital representation of the magnitude of a first of said measurements derived at a first depth;

deriving a digital representation of said first depth at which said first measurement was derived;

transmitting said digital representations of said maginitude and said first depth via said telephone link to said remote location;

storing said transmitted digital representations of magnitiude and depth;

positioning a visual indication of said measurement on said display grid in response to said transmitted digital representations of said magntiude and said first depth;

deriving a digital representation of the magnitude of a second of said measurements derived at a second depth adjacent said first depth;

deriving from said digital representations of said magnitude of said first and second measurements a digital representation corresponding to a difference between said magntiudes;

transmitting via said telephone link said digital representation corresponding to said difference to said remote location;

retrieving said stored digital representation of said magnitude of said first measurement;

summing said digital representation of said retrieved digital representation and said transmitted digital representation corresponding to said difference; and positioning a next visual indication of said second measurement on said displayed grid in response to said summed digital representations.

14. The method of claim 13, wherein said visual indication and said next visual indication are positioned on said displayed grid simultaneously.

15. The method of claim 14, further including the steps of:

storing said summed digital representation;

deriving a digital representation of the magnitude of a third of said measurements derived at a third depth adjacent said second depth;

deriving from said digital representation of said magnitudes of said second and third measurements a digital representation corresponding to a difference between said magnitudes of said second and third measurements; and transmitting via said telephone link said digital representation corresponding to said difference between said magntidues of said second and third measurements to said remote location.

16. The method of claim 15, further including the steps of:

retrieving said stored summed digital representation;

summing said digital representation of said retrieved summed digital representation and said transmitted digital representation corresponding to said difference between said magnitudes of said second and third measurements; and positioning a third visual indication of said third measurement on said displayed grid simultaneously with said visual indication of said first measurement and said next visual indication of said second measurement.

17. A method for producing at a first location a visual display of data representing successive points on a curve generated at a remote location, comprising the steps of:

generating a digital initialization data block at said remote location;

generating a digital representation of a first data point at said remote location;

transmitting said digital initialization data block and said digital representation of said first data point to said first location via a telephone link;

storing said transmitted digital data at said first location;

generating a digital delta value for each succeeding data point after said first data point, each of said delta values corresponding to a difference between a data point and its succeeding data point;

transmitting said digital delta values to said first location via said telephone link;

storing said transmitted digital delta values at said first location; and generating said visual display from said stored data and delta values at said first location.

18. The method of claim 17, further comprising the steps of:

generating a first error code at said remote location for each transmission of digital data to said first location;

transmitting said first error code to said first location;

generating a second error code at said first location for each transmission of digital data received from said remote location;

comparing said first and second error codes at said first location;

transmitting an error signal from said first location to said remote location if said first error code does not equal said second error code; and retransmitting a data transmission from said remote location to said first location if said error signal is transmitted from said first location and received by said remote location.

* * * * *